United States Patent
Adamson et al.

(10) Patent No.: US 8,643,615 B2
(45) Date of Patent: Feb. 4, 2014

(54) TECHNIQUES FOR RECOGNIZING MULTI-SHAPE, MULTI-TOUCH GESTURES INCLUDING FINGER AND NON-FINGER TOUCHES INPUT TO A TOUCH PANEL INTERFACE

(75) Inventors: Peter S. Adamson, Portland, OR (US); Mark D. Yarvis, Portland, OR (US); David L. Graumann, Portland, OR (US); Sangita Sharma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 35 days.

(21) Appl. No.: 13/169,546

(22) Filed: Jun. 27, 2011

(65) Prior Publication Data

US 2011/0254797 A1 Oct. 20, 2011

Related U.S. Application Data

(62) Division of application No. 12/641,585, filed on Dec. 18, 2009.

(51) Int. Cl.
*G06F 3/041* (2006.01)

(52) U.S. Cl.
USPC .......................................... 345/173; 715/863

(58) Field of Classification Search
None
See application file for complete search history.

(56) References Cited

U.S. PATENT DOCUMENTS

| | | | |
|---|---|---|---|
| 2004/0046791 A1 | 3/2004 | Davis et al. | |
| 2005/0104867 A1* | 5/2005 | Westerman et al. | 345/173 |
| 2005/0229117 A1* | 10/2005 | Hullender et al. | 715/863 |
| 2006/0007170 A1 | 1/2006 | Wilson et al. | |
| 2006/0010400 A1 | 1/2006 | Dehlin et al. | |
| 2006/0215847 A1 | 9/2006 | Hollemans et al. | |
| 2009/0007025 A1 | 1/2009 | Davis et al. | |
| 2009/0249236 A1* | 10/2009 | Westerman et al. | 715/765 |
| 2011/0050618 A1 | 3/2011 | Murphy et al. | |
| 2011/0117526 A1* | 5/2011 | Wigdor et al. | 434/118 |

OTHER PUBLICATIONS

Office Action received for U.S. Appl. No. 13/169,554, mailed on Dec. 19, 2012, 13 pages.
Office Action received for U.S. Appl. No. 13/169,524, mailed on Dec. 26, 2012, 13 pages.
Office Action received for U.S. Appl. No. 12/641,585, mailed on Feb. 27, 2013, 9 pages.
Office Action received for U.S. Appl. No. 13/170,731, mailed on Mar. 22, 2013, 10 pages.
Office Action received for U.S. Appl. No. 13/169,524 mailed on Apr. 25, 2013, 7 pages.
Notice of Allowance received for U.S. Appl. No. 13/169,554 mailed on Apr. 30, 2013, 9 pages.
Notice of Allowance received for U.S. Appl. No. 12/641,585, mailed on Jul. 9, 2013, 11pages.
Notice of Allowance received for U.S. Appl. No. 13/169,524, mailed on Jul. 3, 2013, 6 pages.
Notice of Allowance received for U.S. Appl. No. 13/170,731, mailed on Aug. 5, 2013, 11 pages.

* cited by examiner

*Primary Examiner* — Adam R Giesy
(74) *Attorney, Agent, or Firm* — Sutherland Asbill & Brennan LLP

(57) ABSTRACT

Briefly, a method and apparatus for recognizing multi-shape, multi-touch gestures including finger and non-finger touches input to a touch panel interface is disclosed. The method may include receiving user input with a touch panel interface, recognizing a multi-shape, multi-touch gesture including finger and non-finger touches in the user input, and performing an action associated with the multi-touch gesture including finger and non-finger touches.

27 Claims, 19 Drawing Sheets

3 fingers together
Non-finger touch
Region 1 detected
Start of gesture
3 fingers transition to 1 finger
Region 1 transitions to finger touch
Region 2 appears as a non-finger (palm) touch
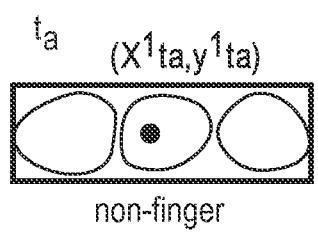
non-finger
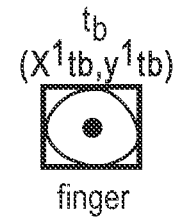
finger
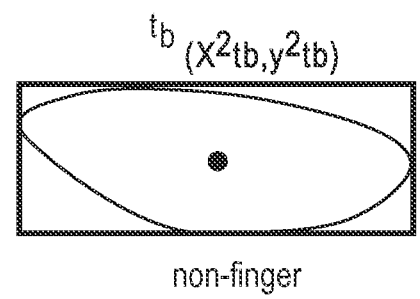
non-finger
FIG. 7A
FIG. 7B

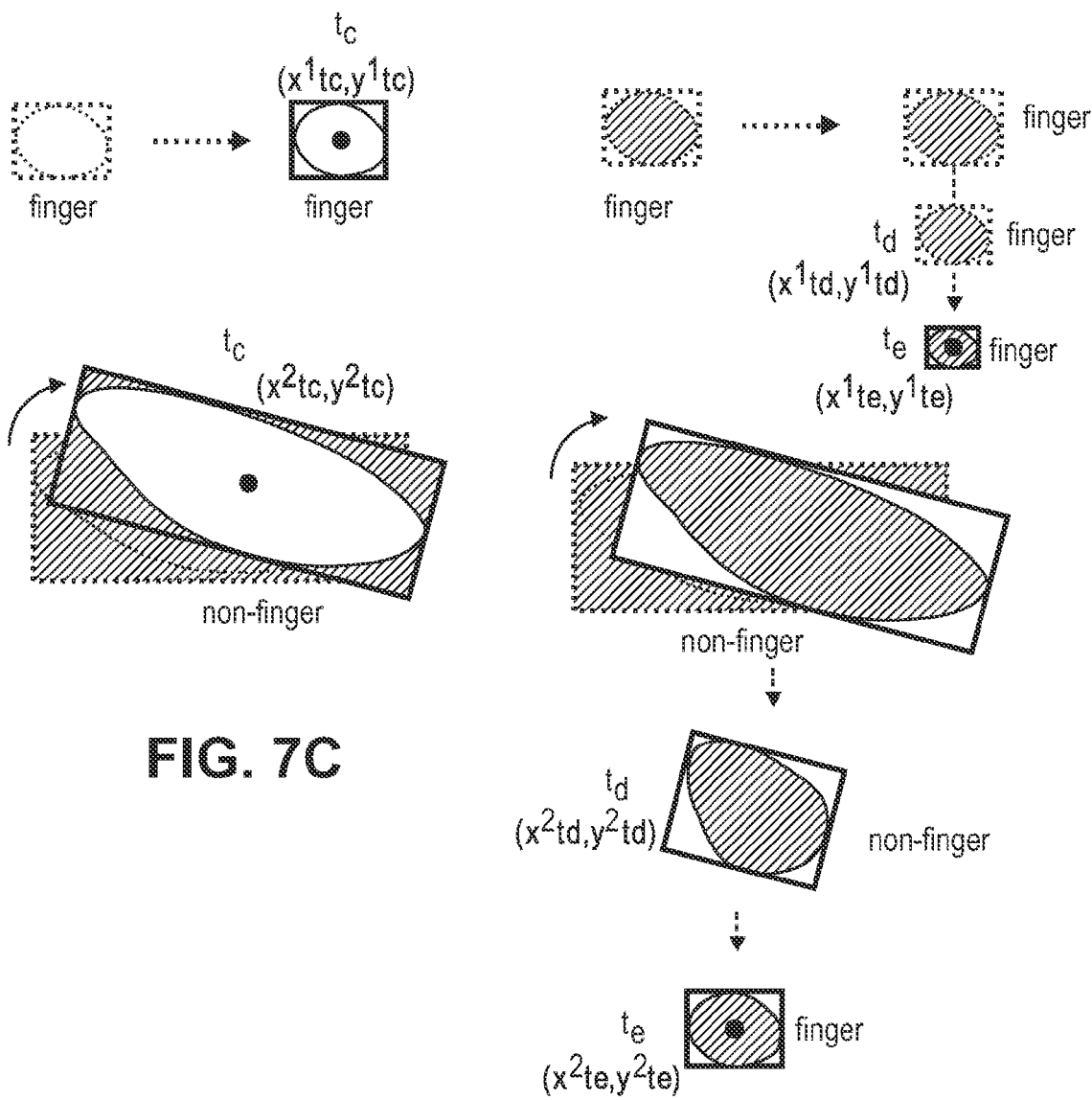

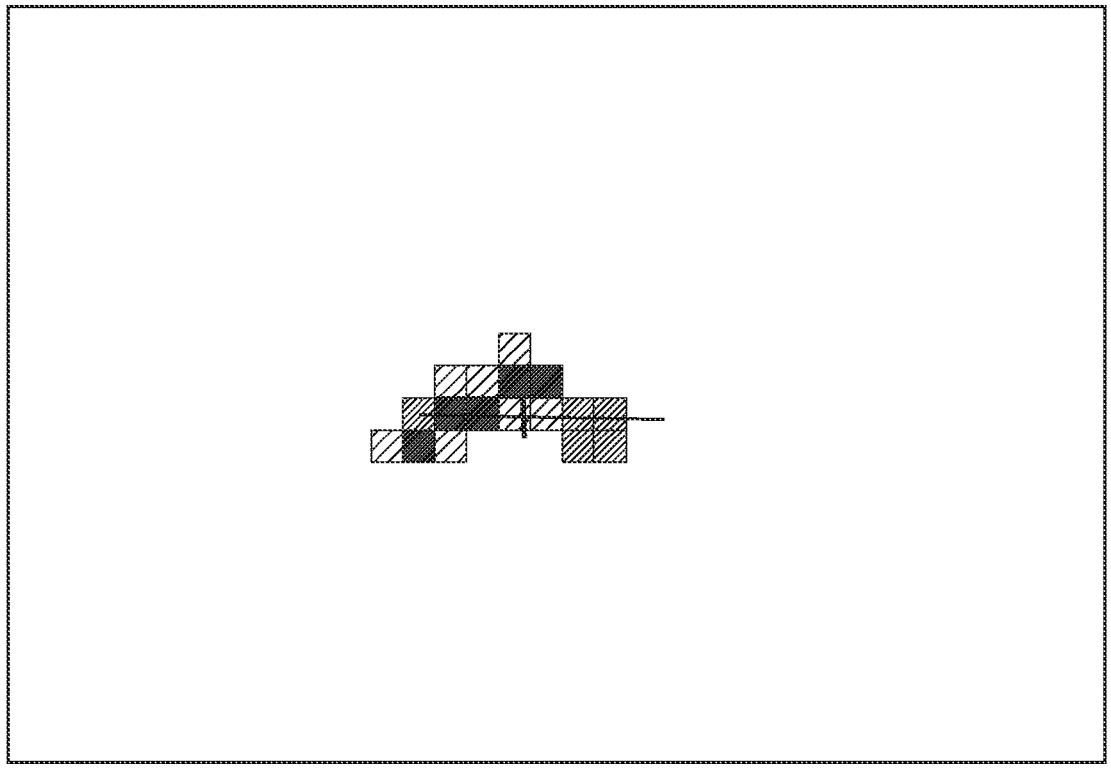
FIG. 14
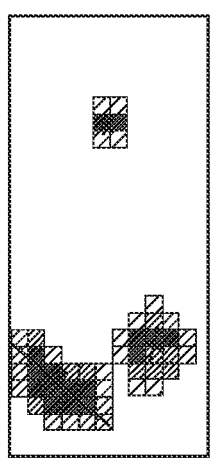 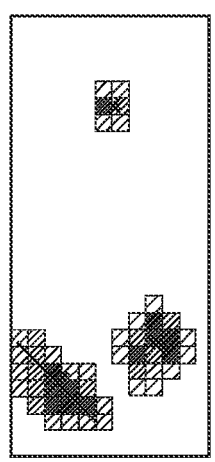 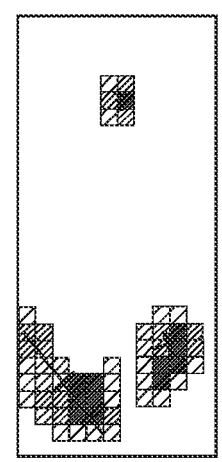 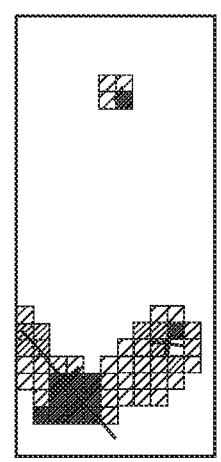
FIG. 15A   FIG. 15B   FIG. 15C   FIG. 15D

TECHNIQUES FOR RECOGNIZING MULTI-SHAPE, MULTI-TOUCH GESTURES INCLUDING FINGER AND NON-FINGER TOUCHES INPUT TO A TOUCH PANEL INTERFACE

CROSS REFERENCE TO RELATED APPLICATIONS

The present application is a divisional application of U.S. patent application Ser. No. 12/641,585, filed 18 Dec. 2009, entitled, "MULTI-FEATURE INTERACTIVE TOUCH USER INTERFACE", by Adamson et al.

BACKGROUND

Description of the Related Art

In recent years, user interfaces to various electronic devices have begun to provide some additional input capability. For example, touch screen devices and soft-keyboards are becoming more common.

Touch-based interfaces provide a minimum amount of capability and flexibility, for example, only supporting simple one or two finger(s) touch-based gestures. For example, current interfaces only support simple key typing which activate the key on finger-down or finger-up actions or alternatively simple gestures like the two-finger zoom-in/out gesture and the single-finger drag gesture for scrolling. These devices typically ignore or discard non-finger touches and require users to hold their hands above the surface unless they intend to type a key.

Further, written communication for text-based applications such as Email is limited to the author's ability to convey their message with words and limited to the recipient's ability to extract the intended meaning without ambiguities or misunderstandings. Emoticons (such as a smiley: ☺ )) and a few text based acronyms (such as LOL) may be added to the content. These added features are limited to primitive smiley faces, use 'canned' animation, express very general emotional ideas over the text, and further text features are not available directly through keyboard typing. Although additional expressions in text based messages are available using today's defacto formats such as MicrosoftWord, they are underutilized. The use of such expressions are limited due to the tediousness of constructing word-by-word or even character-by-character features for expressing the text message because these alterations are buried in a mouse and/or graphical menu driven paradigm that hinders potentially flowing expression directly from our hands.

A more feature rich user interface is desired, one that minimizes complexity and display cluttering while enhancing the user experience.

BRIEF DESCRIPTION OF THE DRAWINGS

The present invention may be better understood, and its numerous features and advantages made apparent to those skilled in the art by referencing the accompanying drawings.

FIGS. 7A-7D illustrates an example of a multi-touch multi-shape gesture according to an embodiment of the present invention.

FIG. 14 illustrates a dual thumbs tracking position according to an embodiment of the present invention, with both thumbs on the surface in the word attribute start position.

FIGS. 15A-15D illustrates subtle key animation attribute assignment with an index finger according to an embodiment of the present invention.

The use of the same reference symbols in different drawings indicates similar or identical items.

DESCRIPTION OF THE EMBODIMENT(S)

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Unless specifically stated otherwise, as apparent from the following discussions, it is appreciated that throughout the specification discussions utilizing terms such as "processing," "computing," "calculating," or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data from registers and/or memory to transform that electronic data into other electronic data that may be stored in registers and/or memory. A "computing platform" may comprise one or more processors.

Figure 1:
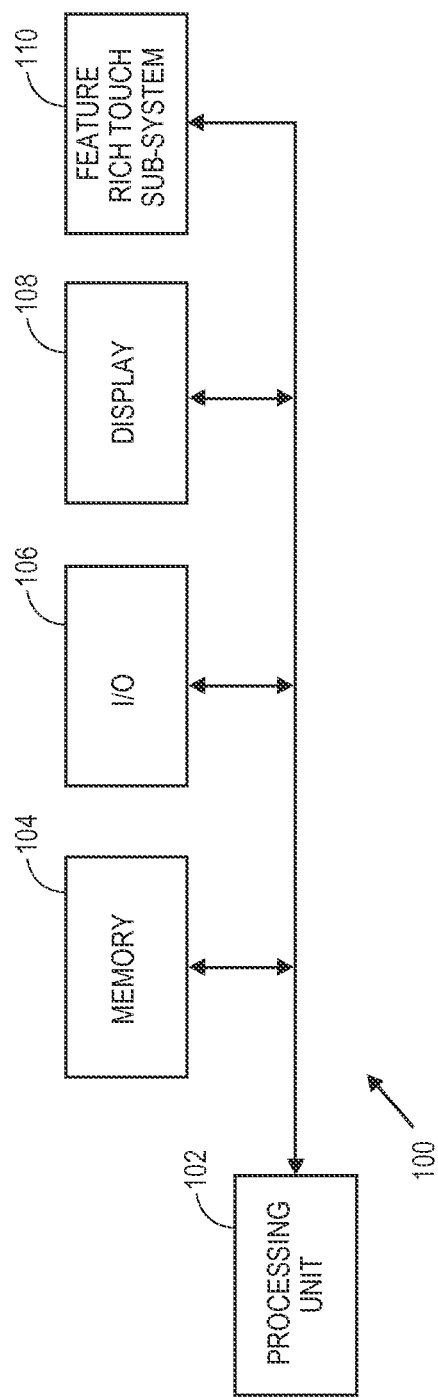
FIG. 1 illustrates a basic electronic device with a feature rich touch subsystem according to an embodiment of the present invention.

FIG. 1 illustrates a basic electronic device according to an embodiment of the present invention. Electronic device 100 may be any type of electronic device having a user interface, for example, including, but not limited to personal computers, handheld devices, cell phones, consumer electronic device, kiosk, home appliances, and the like. Electronic device 100 may include a processing unit 102, memory 104, various I/O interfaces 106, a display 108, and a feature rich touch subsystem 110. Processing unit 102 may include one or more processors or processing logic. Memory 104 may include a memory cache subsystem, a disk subsystem, bios memory, and/or other storage mediums. Various I/O interfaces 106 may include input and/or output subsystems such as audio I/O, a wired or wireless interface, a USB interface, and the like. Touch subsystem 110 provides a feature rich user input and is further described in the embodiments below. Note that one or more of the elements listed above may be omitted from electronic device 100, and in an alternative embodiment, touch subsystem 110 may be a stand-alone device.

According to embodiments of the present invention, feature rich touch subsystem 110 includes one or more novel user input capabilities that enhance the user experience of electronic device 100. Touch subsystem 110 may be a large or small touch interface for receiving and/or interpreting user input.

According to an embodiment of the present invention, touch subsystem 110 is capable of receiving and interpreting temporal gesturing as user input. A time-based tapping pattern may be used for quick and convenient access to applications and services. Such user input may require only a small and/or dynamically-allocated region of a touch panel. According to an embodiment of the present invention, the user may tap a distinct pattern anywhere on the screen to activate a desired response, a method ideal for small displays with a limited amount of spatial real estate.

Figure 2:
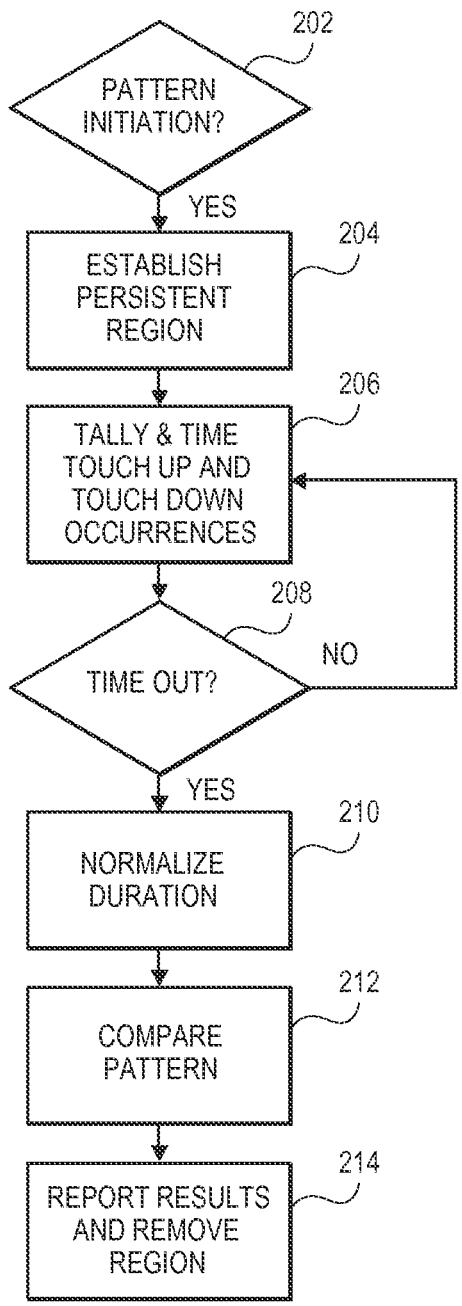
FIG. 2 illustrates a temporal tapping flow diagram of a touch subsystem capable of receiving and interpreting temporal input signals according to an embodiment of the present invention.

FIG. 2 illustrates a temporal tapping flow diagram of a touch subsystem 110 capable of receiving and interpreting temporal input signals according to an embodiment of the present invention. First, a pattern initiation shape is identified, block 202. This pattern initiation shape is an indication that a temporal input pattern is about to begin. The pattern initiation shape can be any unique pattern, for example, a three finger touch in a location. Touch subsystem 110 stably detects a pattern initiation shape such as a distinct non-finger-shape (that is, a non-single-finger or other shape) interaction on the touch panel. Once the pattern initiation shape is identified, a persistent region may be established, block 204. A persistent region may be, for example, a bounding box under the touched region for monitoring the subsequent tap pattern.

Monitoring for a tapping pattern may only be focused on the region of the panel where the user placed the original pattern initiation shape. Touch up and touch down instances are monitored, timed and recorded, block 206. If, after the pattern initiation shape is identified in block 202 or during the tallying of the touch up and touch down instances in block 206, a touch down instance does not occur within a specified time threshold, the pattern times out, step 208. The recorded pattern is normalized, block 210. Normalization of the pattern is performed to compensate for user variations in pattern tapping speed. The pattern is compared to existing template patterns for correlation, block 212. Once a pattern is identified, the pattern is acted upon, or negative results are reported and the persistent region removed, block 214. The pattern may be associated with, for example the opening of a specific application or some other preset computing event.

According to one embodiment of the present invention, if a tapping pattern is not recognized, the user may be prompted to associate the pattern with a computing event. Thus, patterns may be pre-defined or defined during use by the user.

Figure 3:
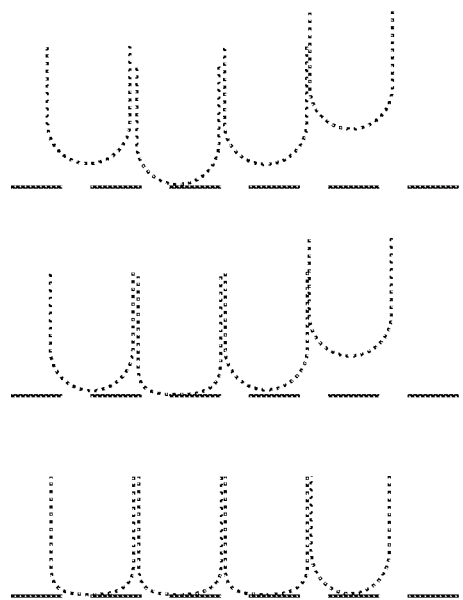
FIG. 3 illustrates a debouncing of the onset of a non-finger touch shape as performing a pattern initiation shape recognition according to an embodiment of the present invention.

FIG. 3 illustrates a debouncing of the onset of a non-finger touch shape as performing the pattern initiation shape recognition in Block 202 of FIG. 2 according to an embodiment of the present invention. As illustrated, the placement of a non-touchpoint shape on a touch panel evolves over several frames. It often starts with a single touchpoint followed by other neighboring fingers as they land on the panel over a period of time, for example, multiple time windows of 50 msec or less. To properly classify the user's intention of placing a pattern initiation shape, for example, several clustered fingers on to the panel, the debouncing stage waits a set amount of time, for example, 200 msec after the onset of the initial touch observation before declaring the interaction shape. If the shape remains a fingertip touch shape after this time, then no tapping is processed. If the shape of the contact is determined to be the pattern initiation shape, for example, a cluster of fingertips, then 'tap start' is declared and the process proceeds to Block 204 of FIG. 2. The method for shape classification may be hull deformation between the cluster's hull and its perimeter as well as the angle of its principle component analysis to the screen.

Figure 4:
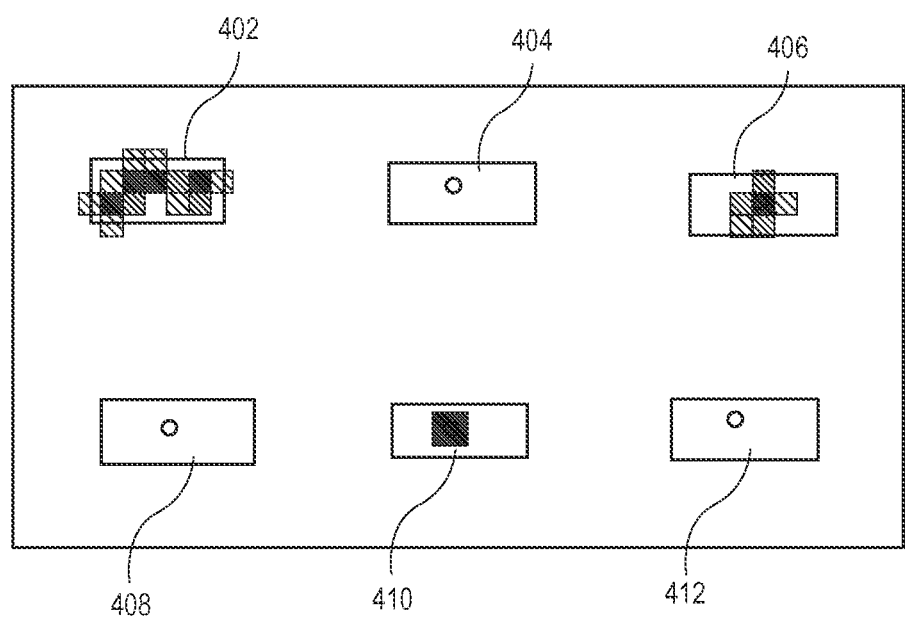
FIG. 4 illustrates a touch screen view perspective of a temporal gesture according to an embodiment of the present invention.

FIG. 4 illustrates a touch screen view perspective of a temporal gesture according to an embodiment of the present invention. Regions 402 through 412 illustrate a sample tapping pattern over time. Region 402 illustrates the pattern initiation shape action. The outlined box is the persistent region which is established and monitored for a tapping pattern. Monitoring for a tapping pattern is only focused on the region of the panel where the user placed the pattern initiation shape, for example, a finger cluster depicted in Region 402. A box area under the clustered finger shape is defined and the detected pattern debounced. Regions 404, 408 and 412 illustrate touch up actions. Regions 406 and 410 illustrated touch down actions. Region 412, a touch up action, times out, ending the pattern and triggering the removal of the persistent region. Upon time out, a tap sequence report will be generated and the box region will stop being monitored for tapping patterns. For another tap sequence to become active, another pattern initiation shape must be debounced and recognized. Note that a tapping pattern may contain any number of touch down/touch up instances according to an embodiment of the present invention.

Touch up and down actions are monitored, timed and recorded. Timing may be recorded as a number of frames that the touch up or the touch down action was active until a touch up time out. A typical timeout of a touch up action (that is, no touch down actions within a period of time) may be 750 msec.

In this way, a vector version of the sequence of every touchup and touchdown is constructed in terms of incoming frame counts. The vector's contour represents the raw form of the temporal pattern of the user's sequence, and is eventually compared to existing patterns in block 212.

Figure 5:
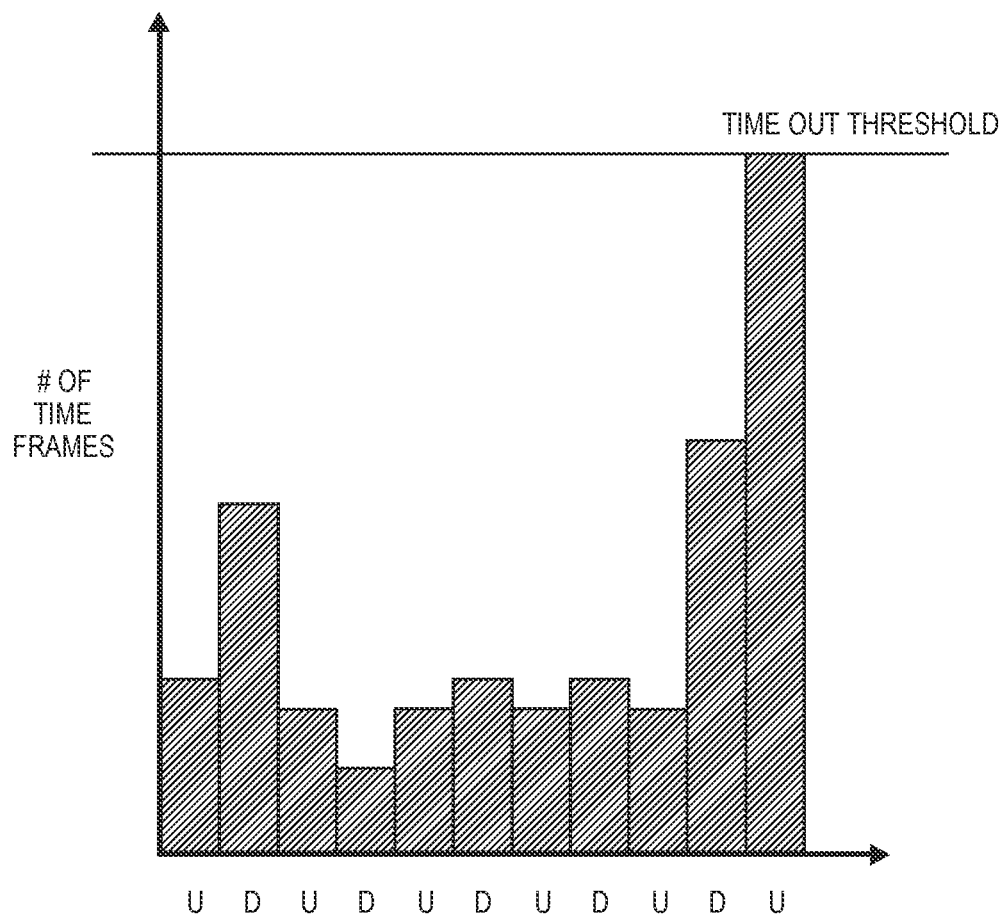
FIG. 5 illustrates a typical tapped pattern tally according to an embodiment of the present invention.

FIG. 5 illustrates a typical tapped pattern tally according to an embodiment of the present invention. A horizontal 'U' indicates the accumulated frames when no touchpoints are observed with in the region, and a 'D' represents a down touchpoint tallied when a contact is seen within the region. The upper 'time out' threshold is use to compare a U count to a maximum value. When any up U tally exceeds this threshold, the pattern is deemed complete and the recording is terminated and compared to other patterns in memory.

After the pattern is tallied and timed, the pattern is normalized, block 210. The histogrammed vector established in block 206 may be normalized by converting all tallied bins as illustrated in FIG. 5 into floating point values and then dividing each individual tally by the number of total frames used in the entire histogram. Each histogram bin (which is now by definition a floating point value less than 1.0) may be multiplied to 1000 to indicate a common 1000 sample time series for every tapping pattern. Doing so guarantees that the entire sequences occurs in a fixed time scale for comparison with existing temporal patterns.

Figure 6:
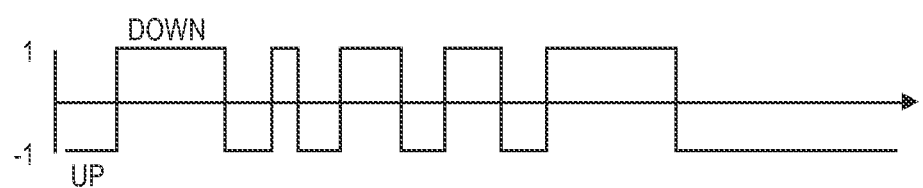
FIG. 6 illustrates a representation of a time series derived from the tallied bins according to an embodiment of the present invention.

Once normalized, the pattern is correlated with other templates or patterns, block 212. From the normalized histogram vector, a time series may be constructed where every touchup frame is represented by a −1 and every touchdown frame is represented by a +1. This time series is established by transposing the histogram in a left to right fashion into a 1000 point vector in memory of +−1 values. FIG. 6 illustrates a representation of a time series derived from the tallied bins according to an embodiment of the present invention. Other time series patterns, previously defined in the system, are then tested for closeness. Cross correlation is used between two normalized time series using +−2 frame lags. Cross correlation for a single lag is performed using:

$$\sum_{n=0}^{N-1} T(n)P(n-l)/1000$$

where T represent an existing serial pattern,
P represents the new recorded pattern
n represents the normalized sample count (1-1000)
and 1000 represents the normalization size of any one serialized vector The lag 'l' shown in the above equation is used to compensate for drift in the template by sweeping the 'l' from −2 to +2 in single unit increments. This produces five correlation peaks computed near the original patterns starting sequence. The outcome of this correlation function is +1 for a perfect match and −1 for a perfect mismatch.

Once the tapping pattern has timed out in block 208, the region is disbanded, and the area is relinquished back to normal system touch interaction, block 210. Confidence factors and pattern name may be reported in block 210. The maximum peak of the normalized cross-correlation may be compared to a threshold of 0.8. If any of the correlation peaks (at any of the lags) exceeds this threshold, then the maximum is reported along with the established pattern name for this pattern. In other words, the largest correlation peak of any pattern T, on any lag 'l' is declared a pattern match to that template, with the largest correlation peak of all existing template patterns is reported as the best match for this user pattern.

According to one embodiment of the present invention, in the case of an unrecognized pattern, the user may be prompted to define the new pattern or try again, block 210.

In the case where the user can not remember the pattern choices, then the system may in some way notify the user, for example, play an audio tone and/or show a dot pattern on the screen that mimics the pattern over a 3 second duration. In this way the report and template patterns may be shared and constructed with the user.

Currently, a user must access non-visible windows and platform features by rummaging through icons, menu bars, and feature lists. For special platform features such as extended displays, wireless activation, and screen brightness, the OEM must add hardware buttons and take up surface real estate. According to an embodiment of the present invention, space requirements, overhead, and cost are removed and/or reduced.

According to an embodiment of the present invention, feature rich touch subsystem 110 may be capable of receiving and recognizing gestures based on combinations of finger and/or non-finger touches. Touch subsystem 100 includes gesture identification techniques capable of identifying different multi-touch multi-shape gestures by analyzing temporal and spatial relationships between multiple touches according to an embodiment of the present invention.

A gesture may be pre-defined or defined by a user at runtime by the user associating a specific action or command to the gesture. A user-defined gesture may be used as a user password with added security measures imposed or any other such desired action or command.

A gesture may be created by concurrent use of the fingers and/or palms of one or both hands that occur in a single user interaction. A single user interaction may be defined from the start of a touch on the panel to the point when there is no touch on the panel. The start of a gesture may be determined as either the start of the user interaction in a pre-designated area of the panel or the start of a specific system gesture that in turn signals the start of the multi-touch multi-shape gesture.

FIGS. 7A-7D illustrates an example of a multi-touch multi-shape gesture according to an embodiment of the present invention. The gesture of FIGS. 7A-7D is created using a finger and the heel of the palm of one hand and the specific interaction created by their movement.

As illustrated in FIG. 7A, a pre-defined three finger gesture indicates to the system to start recording a multi-touch gesture. Any finger and/or non-finger (non-finger herein refers to non-single finger) combination may be defined as a gesture initialization and the present invention is not limited to the combination illustrated in FIG. 7A. As illustrated in FIG. 7B, once the recording starts, the three fingers transition to a single finger and the heel of the palm simultaneously makes panel contact. As illustrated in FIG. 7C, the finger then moves to the right that also results in slight rotation of the heel of the palm. As illustrated in FIG. 7D, the hand then drags down causing the finger and the heel of the palm to move down. And finally the hand is lifted off the panel (not shown) causing the user interaction to end. According to an embodiment of the present invention a gesture may be defined by this entire user interaction from the start of gesture recording to the end of the interaction.

Figure 8:
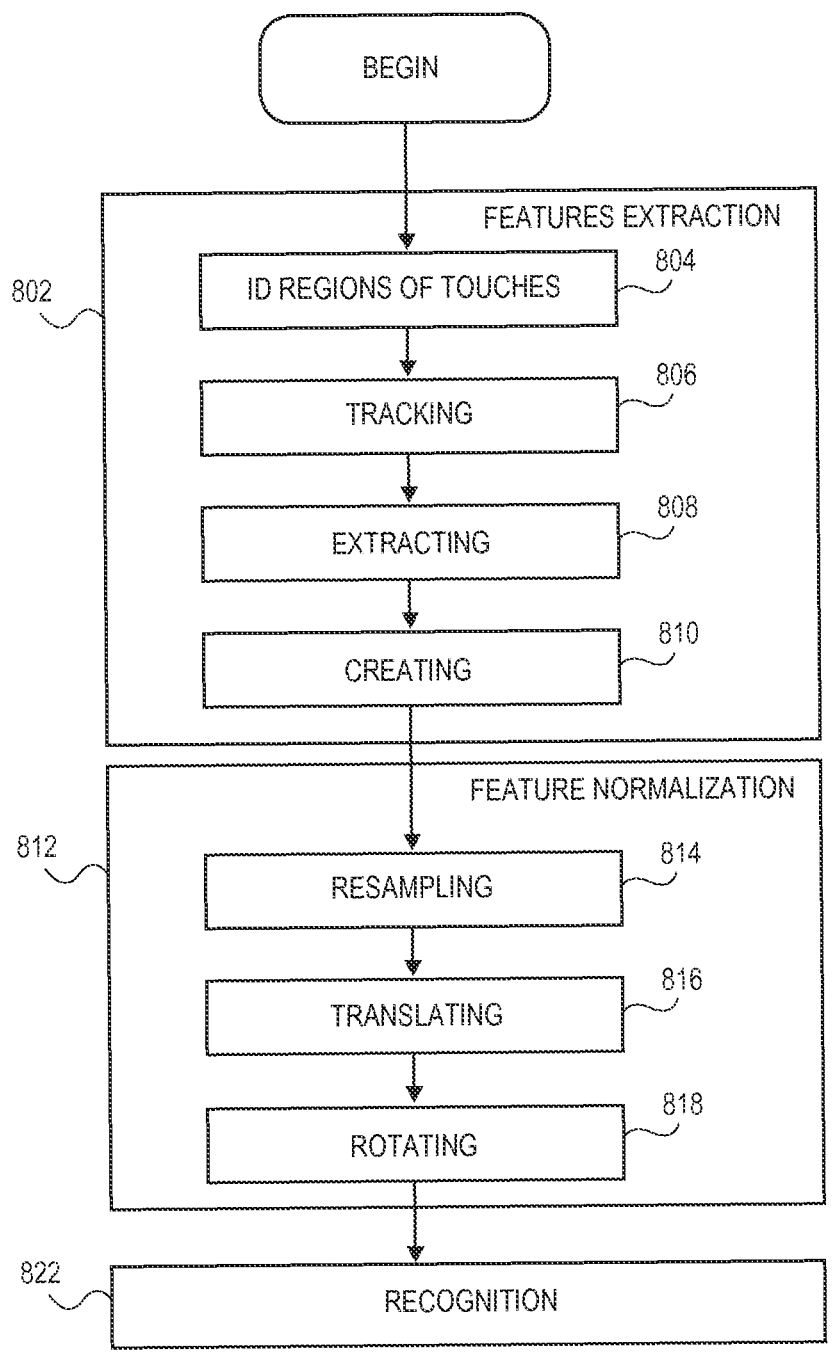
FIG. 8 illustrates a gesture identification flow diagram according to an embodiment of the present invention.

FIG. 8 illustrates a gesture identification flow diagram according to an embodiment of the present invention. Upon recognition of the start of the gesture (as illustrated in FIG.

7A), three main tasks are performed, features extraction block 802, followed by feature normalization block 812, and then recognition block 822.

Figure 9:
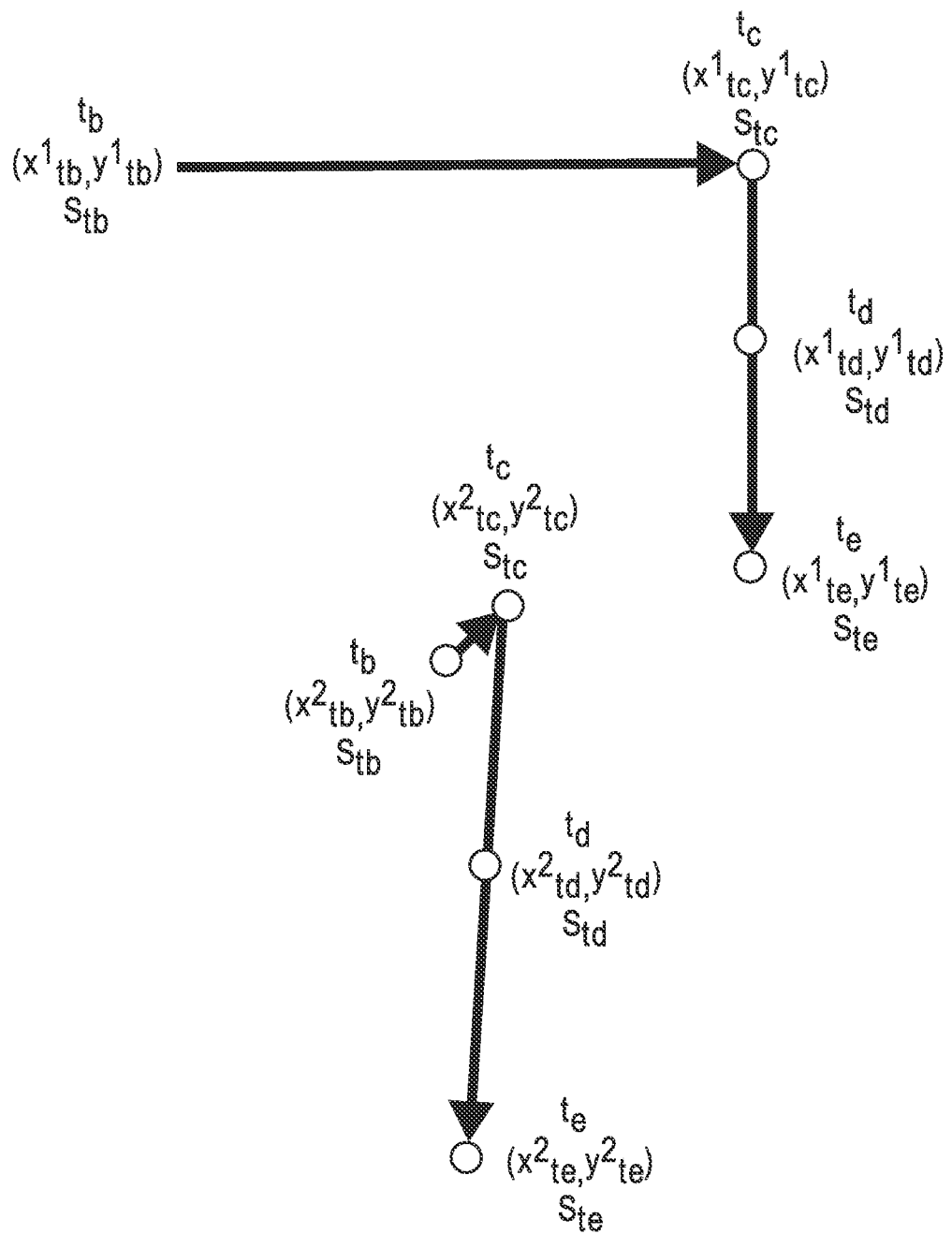
FIG. 9 illustrates a path created by a multi-touch, multi-shape gesture according to an embodiment of the present invention.

Features extraction block 802 extracts a set of features from the gesture-related user interaction. A multi-touch, multi-shape gesture is characterized by a set of touches, their evolution over time and their spatial and temporal relationship with respect to each other. Features extraction block 802 includes multiple subtasks, blocks 804-810. In block 804, a region of touches is identified. A region can be defined as an individual touch or a predefined area on the panel or an automatically generated area on the panel that encompasses a set of touches that are grouped together based on proximity. In block 806, these regions are tracked over time for the duration of the gesture. In block 808, features from each region are extracted. Specific features that can be extracted include the location (x,y) and shape (s) of the region at each sampled time instant. An example of the shape classes may be finger/non-finger classes that represent a shape created by a single finger touch and those created by non-finger regions of the hand, for example, palm, edge or multiple fingers together. In block 810, a time series of the extracted features over the duration of the gesture is created. FIG. 9 illustrates a path created and the features of the two regions of the example gesture in FIG. 7 according to an embodiment of the present invention. The time series may be illustrated as: $\{(x_{t_1}^1, y_{t_1}^1, s_{t_1}^1),(x_{t_1}^2, y_{t_1}^2, s_{t_1}^2), \ldots, (x_{t_1}^M, y_{t_1}^M, s_{t_1}^M)\}, \{(x_{t_2}^1, y_{t_2}^1, s_{t_2}^1),(x_{t_2}^2, y_{t_2}^2, s_{t_2}^2), \ldots, (x_{t_2}^M, y_{t_2}^M, s_{t_2}^M)\}, \ldots, \{(x_{t_N}^1, y_{t_N}^1, s_{t_N}^1),(x_{t_N}^2, y_{t_N}^2, s_{t_N}^2), \ldots, (x_{t_N}^M, y_{t_N}^M, s_{t_N}^M)\}$ where, M: total number of regions N: total number of time samples of this gesture (x, y): the location of a region on the panel s: the shape of the region Once the features are extracted, there is a need to normalize the features for later matching with the training templates of the gestures. Different examples of the same gesture will show variations due to the user variations in speed of hand movement during gesture creation, where on the panel the gesture is created, variations due to the angle of the panel and also size of the gesture itself. For user-dependent gestures, the size of the gesture represents a user-specific characteristic. Hence the normalization may account for all the other variations besides size to preserve the user-specific information.

Feature normalization block 812 includes multiple subtasks, blocks 814-818. In block 814, the path of the gesture is resampled to normalize for speed variations during gesture creation. The speed manifests in the variable number of samples of a gesture obtained during different creations of the same gesture. Resampling normalizes the gesture path to a fixed number of samples to enable matching with the training templates of the gesture. In block 816, the gesture is normalized for location variation on the panel. The center of mass of the entire gesture path is moved to (0,0) by removing the spatial mean of the width and height of the path. In block 818, the gesture is normalized for rotation variations. The gesture path is anchored around its spatial center. The path can be rotated such that the starting sample of the gesture and the spatial center are aligned at 0 degree angle.

In recognition block 822, after gesture path normalization, the gesture is compared to the training templates of allowed gestures for gesture identification. There are a variety of methods that can be used for this purpose. A geometric distance measure is one such measure that is well-suited for the purposes of user-defined gestures. User-defined gestures are limited by the amount of training data available and make it difficult to create complex training models (such as Hidden Markov Models) for recognition. The distance measure can be applied on the location and shape features of the normalized feature vector such that the spatial and temporal relations are compared. The gesture of the template that results in the smallest distance can then be assigned to the created gesture.

The above description assumes a path associated with the gesture. For stationary gestures (gestures not involving any movement of the touches), the recognition can be accomplished by shape identification algorithms according to an embodiment of the present invention.

According to an embodiment of the present invention, feature rich touch subsystem 110 provides a convenient and intuitive method for users to convey meaning and context within their text based messages. According to an embodiment of the present invention, users may express messages in their text using special touches on a touch screen, as the touch screen extracts additional context directly from the surface interaction. The user types on their keyboard to enter text into applications such as e-mail or blog front-end. The keyboard may be enhanced to interpret the user's touch interacts with each key stroke. The keyboard may also be enhanced to interpret the user's touch interactions over the entire typing surface. These interactions add additional attributes to their message, for example, attributes that help create clarity and added expression beyond just the words. The user does not need to hunt for special menu items for colors and palettes currently buried in GUI driven interfaces. Instead their typing 'style' and added 'touch behaviors' generate a rich set of attributes on the fly. These attributes range from character-to-character font variations as well as higher level text animation.

Figure 10:
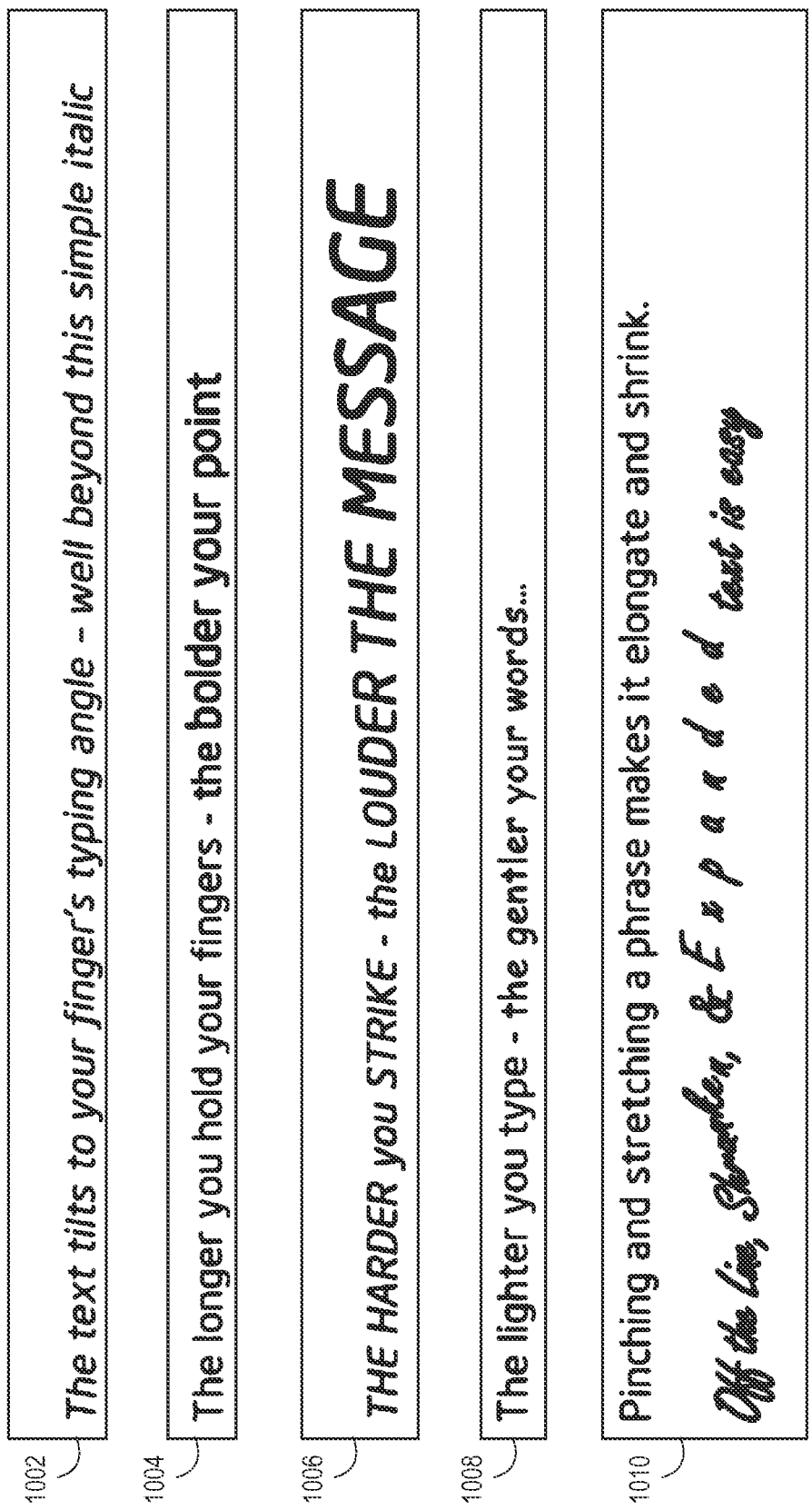
FIG. 10 illustrates several examples of such expressive touch gestures according to an embodiment of the present invention.

FIG. 10 illustrates several examples of such expressive touch gestures according to an embodiment of the present invention. By tilting a finger angle in 1002, the angle of the text is tilted. Holding fingers longer on a key in 1004, text is made bolder. By striking keys harder in 1006, text is made larger and/or bolder. By striking keys softer in 1008, text may be smaller or a different font. By pinching and/or stretching a type phase in 1010, text may be space closer and or farther apart, respectively. How a user touches a phrase may add animation to the text (not shown.) There are many more possible expressive text options possible—embodiments of the present invention are not limited to those shown herein.

Figure 11:
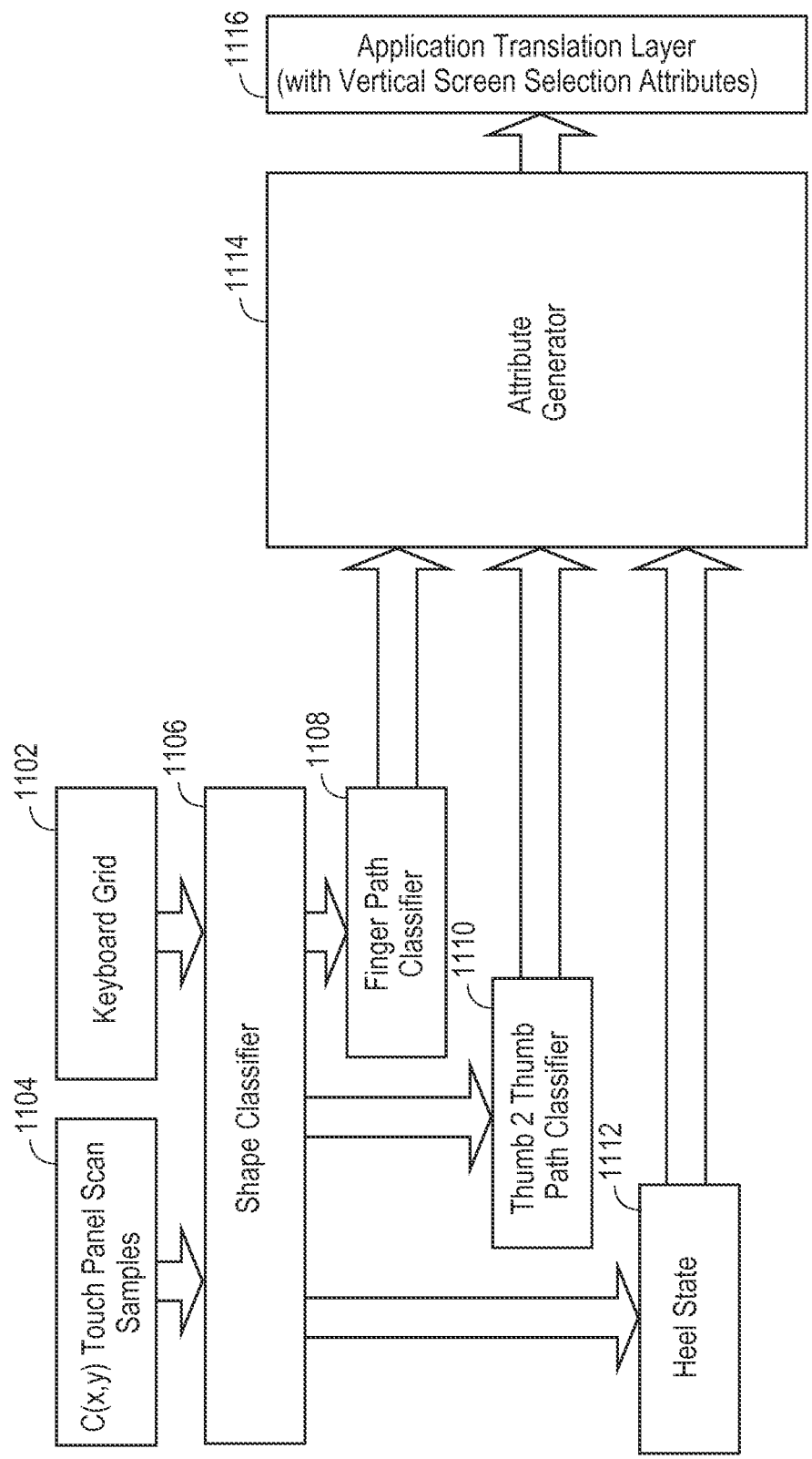
FIG. 11 illustrates an expressive keyboard block diagram according to an embodiment of the present invention.

FIG. 11 illustrates an expressive keyboard block diagram according to an embodiment of the present invention. A traditional mechanical keyboard or a touch panel virtual keyboard 1102 may be used to receive user expression information. For a touch panel virtual keyboard, the user types on a keyboard grid displayed on the horizontal surface of the touch panel. The touching of the surface is captured with a touch sensitive technology such as projected capacitive sensing. The sampling rate should be large enough, for example, greater than 120 Hz, to capture fast taps and sweeping movements on the surface. At least 4 bits of dynamic range between light and firm presses of the surface should be provided above the noise floor. The scanned area should cover the fingers, thumbs, and palm heels of two hands. The spatial resolution of each interaction should be at least 5 mm or if traditional mechanical keys are used, then tilt pressure on each key should be provided in lieu of the 5 mm spatial resolution.

Figure 12:
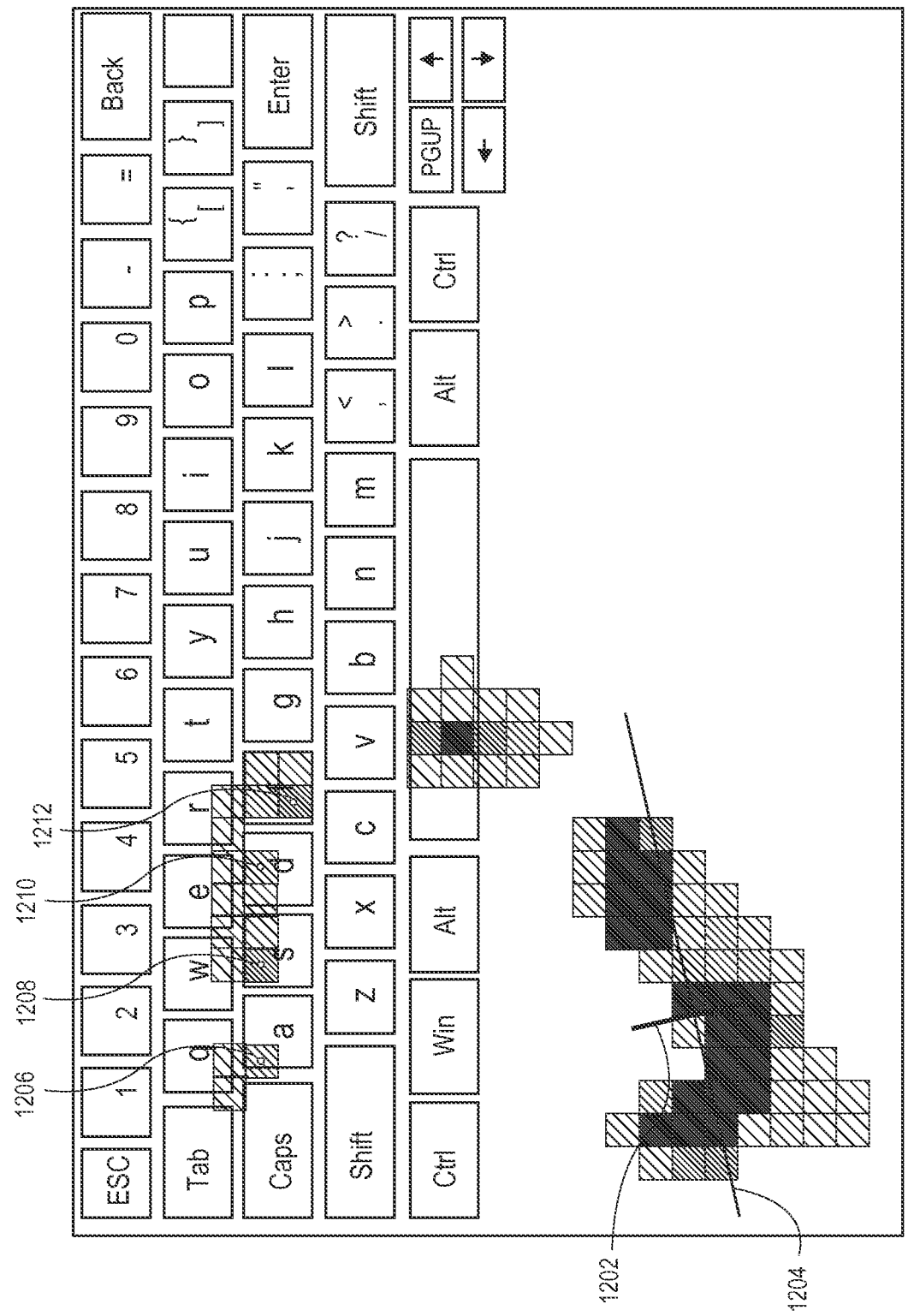
FIG. 12 illustrates a representation of a left hand in home position on a touch panel virtual keyboard according to an embodiment of the present invention.

FIG. 12 illustrates a representation of a left hand in home position on a touch panel virtual keyboard according to an embodiment of the present invention. Gray squares indicate a touch location on a multi-touch panel. Lines 1202 and 1204 (eigen vectors of 2D areas) over the heel of the palm print and the dots 1206, 1208, 1210, and 1212 on the finger prints indicate shape characteristics for determining hand part and key attributes within a single frame. Shape attributes are tracked over time (not shown) for further interpretation.

Frame by frame touch objects are parsed along a variety of paths to fully describe their final presentation. Referring to FIG. 11, frames of interactions may be acquired within a touch surface scanner 1104 and streamed in real-time to a shape classifier 1106. Shape classifier 1106 assigns shape attributes to each surface interaction. In one embodiment, principle component analysis of the 2D shape and touch intensity may be used to assign the type of interaction and key attributes. Shapes are clustered into finger, thumb, and heel objects and passed along their respective paths.

Figure 13A:
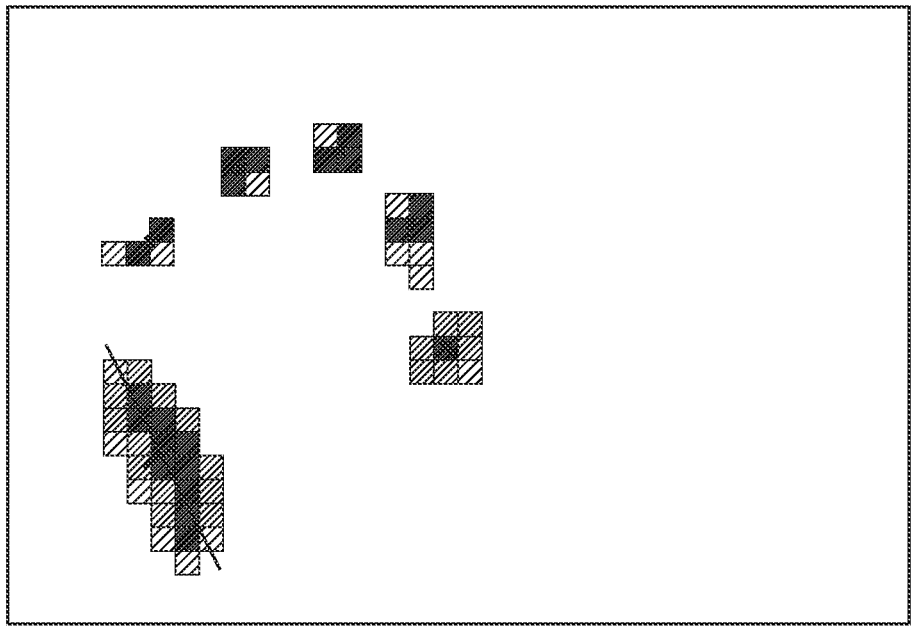
FIGS. 13A-13C showcase three simple attributes, in particular, tilt, bold, and gentle text attributes, respectively, according to an embodiment of the present invention.
Figure 13B:
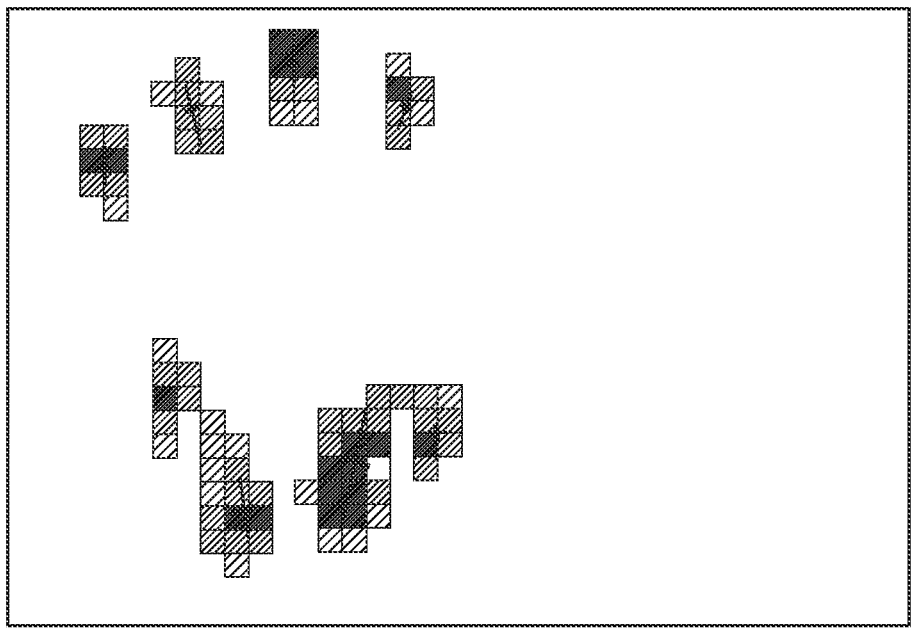
Figure 13C:
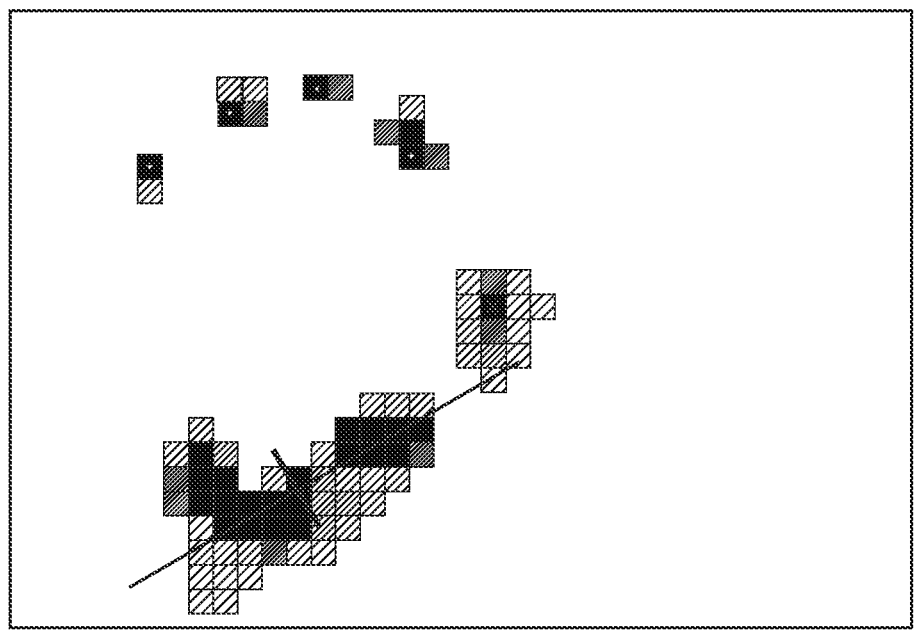

A finger path classifier 1108 determines the keyboard key and the path attributes for each struck character. For example, light touch, firm brisk strike, sliding press, and long hold may be translated into font characteristics of small thin, bold caps, elongated tilted, and bold tall fonts. Both a real-time object tracker and real-time Hidden Markov Model (HMM) Viterbi search engine may be used to process path-dependent finger movement that describe character and word attributes. FIGS. 13A-13C showcase three simple attributes, in particular, tilt, bold, and gentle text attributes, respectively, according to an embodiment of the present invention.

A thumb-to-thumb path classifier 1110 adds additional characteristics to words and phrases beyond that conveyed by intentional finger touches. The initial position of the thumb for engaging these attributes is shown in FIG. 14. FIG. 14 illustrates a dual thumbs tracking position according to an embodiment of the present invention, with both thumbs on the surface in the word attribute start position. Using both thumbs, the word or phrase can be stretched, warped off the line, and reshaped as desired. The markers for start/stop and the exact 'thumb gesture language' may be determined by the application.

Heel shapes are passed to a heel state processor 1112 which interprets the heel position for further text attribute assignment. An example is shown in the first frame for FIG. 13A, where the left palm pad may be used to help determine that italics is intended for the next set of key strokes. Touch area and 'outer and inner' pad closure are also interpreted for start and end of phrase attributes.

The interpretation of all of these shapes is passed to an attribute generator 1114, which combines the various time synchronized surface characteristics for a final attribute assignment of the keyboard stream. These attributes may include typical font attributes such as size, thickness, color, style, start of animation, end of animation, line offset positions, and motion paths.

Finally, an application translation layer 1116 is used to map these characteristics to existing application interfaces including text states of a vertical viewing screen.

FIGS. 15A-15D illustrates subtle key animation attribute assignment with an index finger according to an embodiment of the present invention. Shown are consecutive frames of the index finger sliding off the 'd' key from left to right. This interaction may add a specific feature to the character or word, for example, size animation.

According to an embodiment of the present invention, the keyboard communication channel may be used to embellish typed text with colorful and shapely expressions of meaning conveyed from the way the user's hands touch the keyboard surface.

According to an embodiment of the present invention, a rich interpretation of contours made while typing on a touch sensitive surface may be used to directly control a wide range of character attributes. These attributes range from font and size to animated text strings and pictures.

According to an embodiment of the present invention, feature rich touch subsystem 110 includes a touch panel signal filtering method that can distinguish between a user's resting interactions and their finger typing interactions. The filtering method provides a more natural keyboard response to the user's intentions than today's existing method of simple palm signal rejection.

Figure 16:
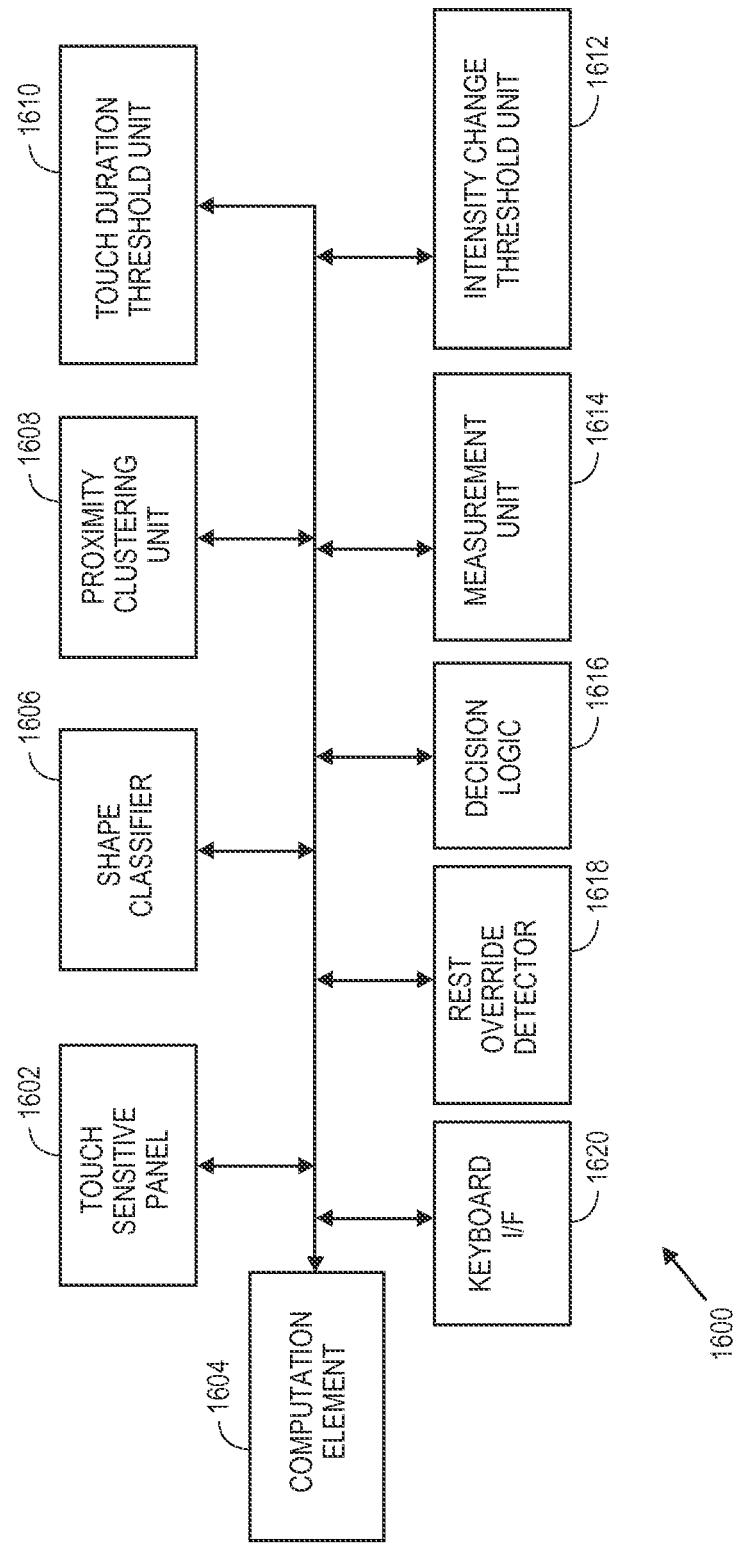
FIG. 16 illustrates a block diagram of a filtering unit according to an embodiment of the present invention.

FIG. 16 illustrates a block diagram of a filtering unit according to an embodiment of the present invention. Filtering unit 1600 may include a touch sensitive panel layering with a visibly shown qwerty keyboard 1602, a computation element 1604 to analyze touch temporal/spatial/coupling information, a shape classifier 1608 to distinguish fingers from non-finger typing intentions, a proximity clustering unit 1610 to avoid transient panel reading from becoming finger typing classifications, a touch duration threshold unit 1610 to latch long panel interactions as rests and not typing strokes, an intensity change threshold unit 1612 for determining hover-brush vs. deliberate keystrokes, a distance traveled measurement unit 1614 to distinguish drags from taps, a decision logic 1616 to finalize a 'keystroke' vs. 'rest' contact type, a rest override detector 1618 to provide repeat-key characteristics, and a traditional keyboard interface 1620.

Figure 17A:
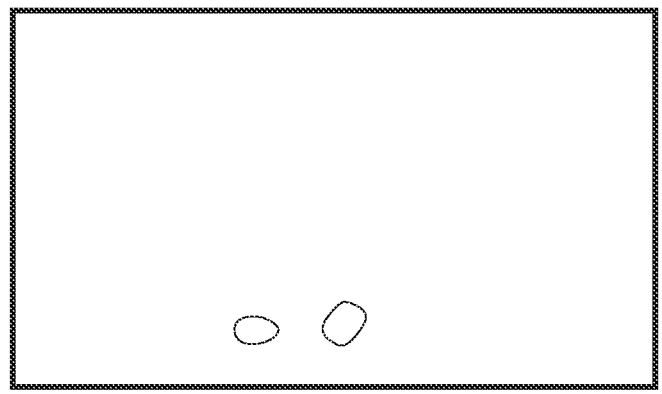
FIGS. 17A-17H illustrates a touch panel sequence according to an embodiment of the present invention.
Figure 17B:
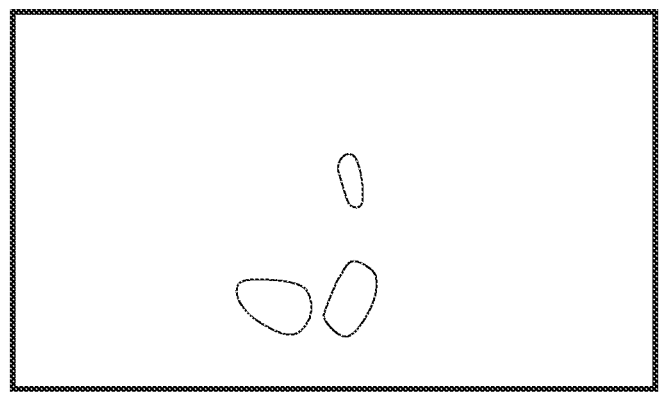
Figure 17C:
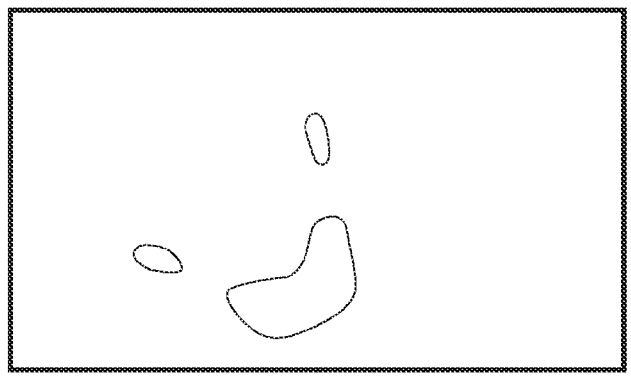
Figure 17D:
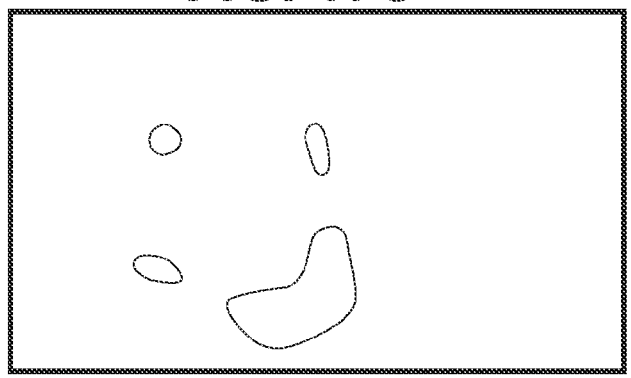
Figure 17E:
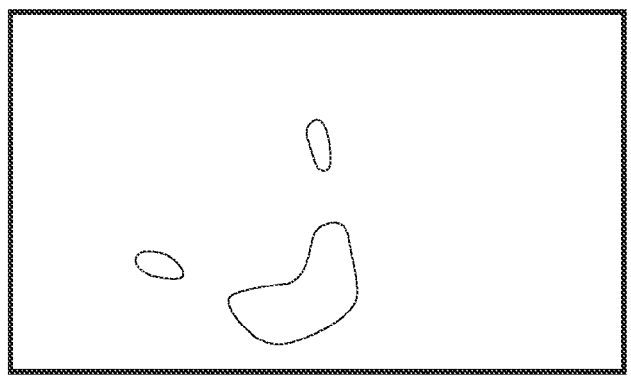
Figure 17F:
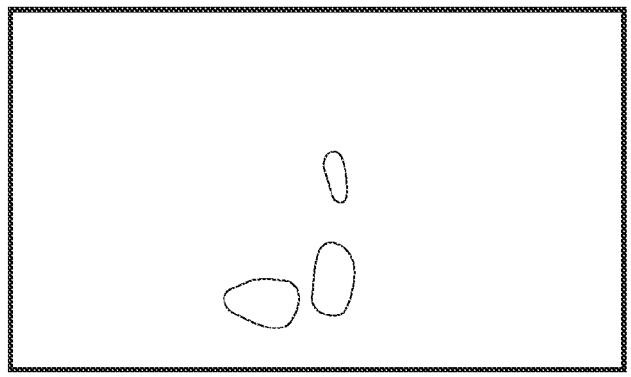
Figure 17G:
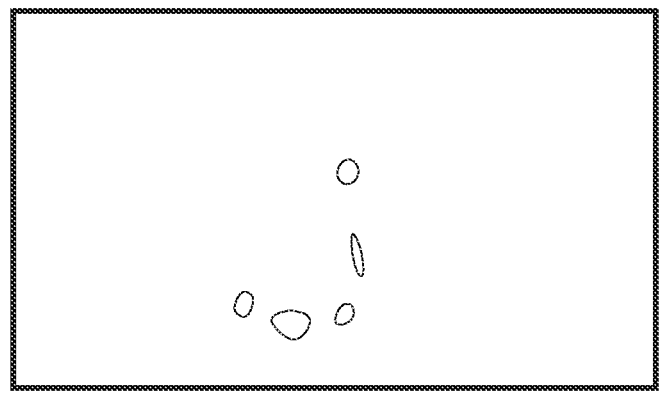
Figure 17H:
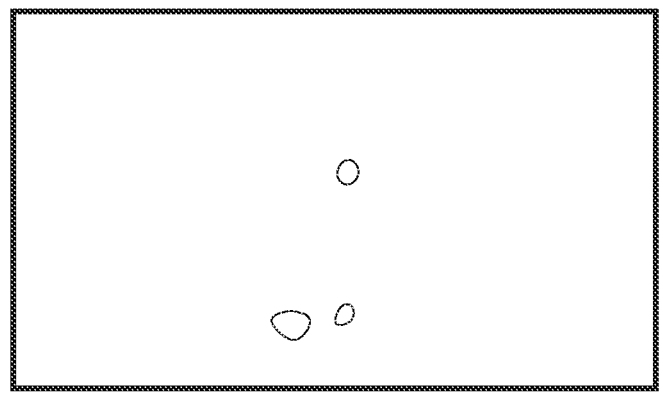

FIGS. 17A-17H illustrates a touch panel sequence according to an embodiment of the present invention. The sequence details the multi-touch panel readings as a user types the letter 'y' on a qwerty keyboard from a resting position. Each figure is illustrated using a right hand from onset of the rest, to the key press, to lifting off the panel. Data arrives into filtering unit 1600 in horizontal x, vertical y, and intensity readings. The x,y spacings may be 8 mm or smaller, providing a 2D matrix of 8 mm square intensities. A full matrix may arrive into filtering unit 1600 at a rate of at least 30 per second, each matrix referred to as a frame. FIG. 17A illustrates a right hand heel onset—note that this impression is similar to finger shapes. FIG. 17B illustrates the next phase of a right hand heel onset—note the identifiable shapes and emerging pinky. FIG. 17C illustrates a right hand in full rest. FIG. 17D illustrates a right hand in full rest with index keystroke down. FIG. 17E illustrates a right hand in full rest with index keystroke up. FIG. 17F illustrates a right hand initial lift. FIG. 17G illustrates a right hand lift with 'sticky' transients. FIG. 17H illustrates a right hand final lift.

Shape classifier 1606 latches shapes, for example, that are larger than 14 mm diameter, as 'non-touch' shapes and removes them from the frame. The shapes may change from frame to frame as the user places their rest masses on the panel. As shown in FIGS. 17A-17H many transient interactions appear as small fingertip shapes. Shape classifier 1606 associates the largest shape seen across frames with the touch shape even if it later shrinks back to a 'finger' type shape. This avoids finger type shapes from becoming keystrokes on lift off—as seen in FIGS. 17G and H.

Proximity clustering unit 1608 identifies all finger shapes that reside on the panel within 8 mm of non-finger shapes. This proximity observation is associated with a shape across frames for the duration of the shape. This avoids transient finger shapes that often emerge on the edges of larger blobs, from being falsely released as keystrokes due to their short panel existence. The touch shapes in FIGS. 17G and 17H that exist on the panel for a short duration are excluded as keystrokes because of their proximity to other shapes.

All shapes are time-stamped at their onset by touch duration threshold unit 1610. If a shape has remained on the panel for over 150 msec it is classified as a resting contact. In one embodiment, this number may be set by the user. In another embodiment it is learned while the user interacts with the keyboard. In FIGS. 17C-17F only the tap of the upper left finger will fall below this threshold. All other contacts will exceed this time threshold and be latched as 'Resting'.

Figure 18:
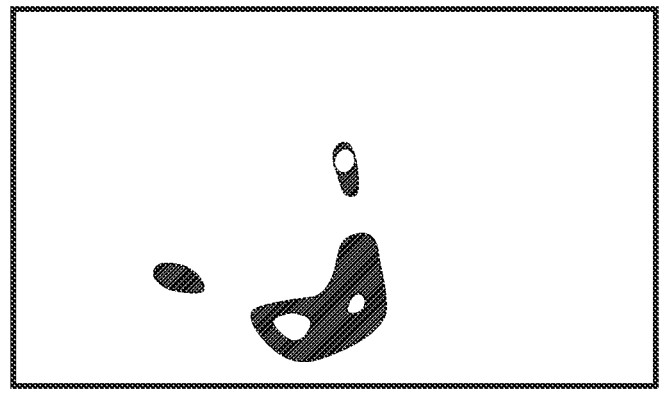
FIG. 18 illustrates a right hand brush with hover according to an embodiment of the present invention.
Figure 19:
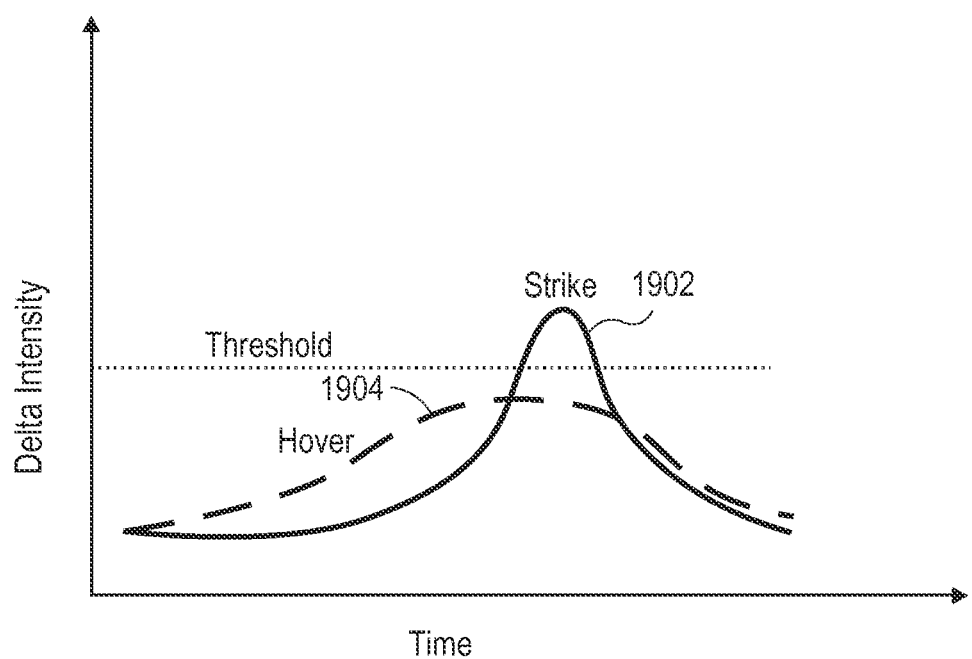
FIG. 19 illustrates a touch cell rate of intensity change over time according to an embodiment of the present invention.

All panel cell intensity values may be averaged with two different time constants by intensity change threshold unit 1612. A fast averaging may be used which reacts to 50 msec contact onsets and a slow averaging may be used which only reacts to 250 msec onsets. If the value spread between the fast and slow averages exceed the 'keystroke' vs 'hover' threshold, then a fast approach' is declared. FIG. 18 illustrates a right hand brush with hover (grey) according to an embodiment of the present invention. FIG. 19 illustrates a touch cell rate of intensity change over time according to an embodiment of the present invention. Short lived panel brushes by the resting hand will be eliminated as non-keystrokes by their slow contact onset.

The center of mass of a single shape is computed across frames and the Euclidean distance between the starting frame and ending frame is computed by measurement unit 1614. If the distance exceeds 8 mm, then this shape may be declared 'Traveled'.

All shapes that have vanished from the panel with the following associated characteristics are declared a 'Keystroke' by keystroke decision logic 1616: shape type 'finger' was sustained throughout contact; contact vanished from panel before Rest Duration exceeded; contact was not clustered with larger shapes; intensity onset rate exceeded hover threshold; center of mass did not travel on the panel; and center of the shape on the touch panel is declared a keystroke and mapped to one of the visual qwerty keys, according to an embodiment of the present invention.

To achieve the keyboard key-repeat behavior, the user double taps and holds the key down. Rest override detector 1618 monitors for this double keystroke and subsequent hold. If an area on the panel is struck and held within 5 mm of its previous center of mass and within 300 msec, then the Rest Duration association is overridden, and the keystroke location is repeatedly delivered at a predetermined 'repeat' rate until the hold contact vanishes from the panel.

According to an embodiment of the present invention, the recognition of temporal tapping by feature rich touch subsystem 110 solves display clutter and poor screen utilization issues.

According to an embodiment of the present invention, temporal tapping may be combined with path gestures. For example, a few taps and then a drag could be plausible. In addition, any combination of the previously mentioned features may be used in feature rich touch subsystem 110 according to an embodiment of the present invention.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method, comprising:
  receiving user input with a touch panel interface;
  recognizing a multi-shape, multi-touch gesture including finger and non-finger touches in the user input; and
  performing an action associated with the multi-touch gesture including finger and non-finger touches, the action comprising adding expressive features to text and removing resting interactions of the finger and non-finger touches on the touch panel interface, wherein the adding expressive features to the text comprise one or more of the following:
    tilting an angle of the text based, at least in part, on an angle of the finger or non-finger touch;
    bolding the text based, at least in part, on an amount of time the finger or non-finger touch is in contact with the touch panel interface;
    bolding the text based, at least in part, on an amount of force applied by the finger or non-finger touch to the touch panel interface;
    increasing or decreasing a size of the text based, at least in part, on an amount of force the finger or non-finger touch to the touch panel interface; or
    increasing or decreasing one or more distances between words in the text based, at least in part, on the finger touches comprising two or more fingers moving away from each other or the two or more fingers moving towards each other.

2. The method as recited in claim 1, wherein recognizing the multi-shape, multi-touch gesture including finger and non-finger touches comprises:
  identifying a region of touches;
  tracking changes in the region over a period of time;
  extracting shape and location features of the changes in the region;
  creating a time series of the extracted features;
  normalizing the features; and
  matching the normalized features to known patterns.

3. The method as recited in claim 1, wherein performing the action associated with the multi-touch gesture comprises executing a complex action which otherwise would require one of multiple user steps, a short cut action, and a macro function to execute.

4. The method of claim 1, wherein the user input is made on dynamically-allocated region of the touch panel.

5. The method of claim 1, wherein the touch panel interface is a screen associated with a handheld device, cell phone or consumer electronic device and the multi-shape, multi-touch gesture including finger and non-finger touches is input anywhere on the screen to activate a desired response.

6. The method of claim 1, further comprising:
determining the multi-shape, multi-touch gesture including finger and non-finger touches; and
implementing a command assigned to the multi-shape, multi-touch gesture including finger and non-finger touches.

7. The method of claim 1, further comprising:
determining the multi-shape, multi-touch gesture including finger and non-finger touches is not recognized; and
prompting the user to associate the multi-shape, multi-touch gesture including finger and non-finger touches with a computing event based, at least in part, on determining the multi-shape, multi-touch gesture including finger and non-finger touches is not recognized.

8. An apparatus, comprising:
a touch subsystem including a touch panel for receiving user input in the form of a multi-shape, multi-touch gesture including finger and non-finger touches; and
a processing unit to recognize the multi-shape, multi-touch gesture including finger and non-finger touches in the user input and perform an action associated with the multi-shape, multi-touch gesture including finger and non-finger touches, the action comprising adding expressive features to text and filtering to remove resting interactions of the finger and non-finger touches, wherein the adding expressive features to the text comprise one or more of the following:
tilting an angle of the text based, at least in part, on an angle of the finger or non-finger touch;
bolding the text based, at least in part, on an amount of time the finger or non-finger touch is in contact with the touch panel interface;
bolding the text based, at least in part, on an amount of force applied by the finger or non-finger touch to the touch panel interface;
increasing or decreasing a size of the text based, at least in part, on an amount of force the finger or non-finger touch to the touch panel interface; or
increasing or decreasing one or more distances between words in the text based, at least in part, on the finger touches comprising two or more fingers moving away from each other or the two or more fingers moving towards each other.

9. The apparatus as recited in claim 8, wherein recognizing the multi-shape, multi-touch gesture including finger and non-finger touches comprises:
identifying a region of touches;
tracking changes in the region over a period of time;
extracting shape and location features of the changes in the region;
creating a time series of the extracted features;
normalizing the features; and
matching the normalized features to known patterns.

10. The apparatus as recited in claim 8, wherein executing the action comprises executing a complex action which otherwise would require one of multiple user steps, a short cut action, and a macro function to execute.

11. The apparatus of claim 8, wherein the user input is made on a dynamically-allocated region of the touch panel.

12. The apparatus of claim 8, wherein the touch panel interface is a screen associated with a handheld device, cell phone or consumer electronic device and the multi-shape, multi-touch gesture including finger and non-finger touches is input anywhere on the screen to activate a desired response.

13. The apparatus of claim 8, further comprising:
determining the multi-shape, multi-touch gesture including finger and non-finger touches; and
implementing a command assigned to the multi-shape, multi-touch gesture including finger and non-finger touches.

14. The apparatus of claim 8, further comprising:
determining the multi-shape, multi-touch gesture including finger and non-finger touches is not recognized; and
prompting the user to associate the multi-shape, multi-touch gesture including finger and non-finger touches with a computing event based, at least in part, on determining the multi-shape, multi-touch gesture including finger and non-finger touches is not recognized.

15. A non-volatile computer readable medium encoded with computer executable instructions, which when accessed, cause a machine to perform operations comprising:
receiving user input with a touch panel interface;
recognizing a multi-shape, multi-touch gesture including finger and non-finger touches in the user input, the recognizing of the multi-shape, multi-touch gesture including finger and non-finger touches comprises:
identifying a region for the finger and non-finger touches based, at least in part, on a location of an initiation gesture on the touch panel interface;
tracking set of finger and non-finger touches in the region over a predetermined period of time when the initiation gesture is detected, the region comprising area on the touch panel interface that encompasses the set of finger and non-finger touches that are grouped together based on their proximity to the region or to each other;
extracting shape and location features of the set of finger and non-finger touches in the region at an end of the period of time;
creating a time series of the extracted features;
normalizing the time series of the extracted features; and
matching the normalized time series of the extracted features to known patterns; and
performing an action associated with at least one of the known patterns.

16. The non-volatile computer readable medium encoded with computer executable instructions of claim 15, wherein the action is one of executing a system action, adding expressive features to text, and filtering to remove resting interactions.

17. The non-volatile computer readable medium encoded with computer executable instructions of claim 15, wherein executing a system action comprises executing a complex action which otherwise would require one of multiple user steps, a short cut action, and a macro function to execute.

18. The non-volatile computer readable medium encoded with computer executable instructions of claim 15, wherein the user input is made on a dynamically-allocated region of the touch panel.

19. The non-volatile computer readable medium encoded with computer executable instructions of claim 15, wherein the touch panel interface is a screen associated with a handheld device, cell phone or consumer electronic device and the multi-shape, multi-touch gesture including finger and non-finger touches is input anywhere on the screen to activate a desired response.

20. The non-volatile computer readable medium encoded with computer executable instructions of claim 15, further comprising:
    determining the multi-shape, multi-touch gesture including finger and non-finger touches; and
    implementing a command assigned to the multi-shape, multi-touch gesture including finger and non-finger touches.

21. The non-volatile computer readable medium encoded with computer executable instructions of claim 15, further comprising:
    determining the multi-shape, multi-touch gesture including finger and non-finger touches is not recognized; and
    prompting the user to associate the multi-shape, multi-touch gesture including finger and non-finger touches with a computing event based, at least in part, on determining the multi-shape, multi-touch gesture including finger and non-finger touches is not recognized.

22. The non-volatile computer readable medium encoded with computer executable instructions of claim 15, wherein the normalizing of the time series of the extracted features accounts for variations of speed, location, or rotation in the set of finger and non-finger gestures.

23. A handheld device, comprising: a screen; a touch subsystem including a touch panel incorporated into said screen for receiving user input in the form of a multi-shape, multi-touch gesture including finger and non-finger touches; and a processing unit to recognize the multi-shape, multi-touch gesture including finger and non-finger touches and perform an action associated with the a multi-shape, multi-touch gesture including finger and non-finger touches, the action comprising adding expressive features to text, wherein recognizing the multi-shape, multi-touch gesture including finger and non-finger touches comprises: identifying a region of touches; tracking changes in the region over a period of time; extracting shape and location features of the changes in the region; creating a time series of the extracted features; normalizing the features; and matching the normalized features to known patterns.

24. The handheld device of claim 23, wherein executing a system action comprises executing a complex action which otherwise would require one of multiple user steps, a short cut action, and a macro function to execute.

25. The handheld device of claim 23, wherein the user input is made on a dynamically-allocated region of the touch panel.

26. The handheld device of claim 23, further comprising:
    determining the multi-shape, multi-touch gesture including finger and non-finger touches; and
    implementing a command assigned to the multi-shape, multi-touch gesture including finger and non-finger touches.

27. The handheld device of claim 23, further comprising:
    determining the multi-shape, multi-touch gesture including finger and non-finger touches is not recognized; and
    prompting the user to associate the multi-shape, multi-touch gesture including finger and non-finger touches with a computing event based, at least in part, on determining the multi-shape, multi-touch gesture including finger and non-finger touches is not recognized.

* * * * *